United States Patent [19]

Inaba et al.

[11] Patent Number: 4,511,985
[45] Date of Patent: Apr. 16, 1985

[54] ROBOT CONTROL SYSTEM

[75] Inventors: Hajimu Inaba, Hino; Shinsuke Sakakibara, Kunitachi, both of Japan

[73] Assignee: Fanuc Ltd, Minamitsuru, Japan

[21] Appl. No.: 413,380

[22] PCT Filed: Nov. 18, 1981

[86] PCT No.: PCT/JP81/00346
§ 371 Date: Aug. 25, 1982
§ 102(e) Date: Aug. 25, 1982

[87] PCT Pub. No.: WO82/02435
PCT Pub. Date: Jul. 22, 1982

[30] Foreign Application Priority Data

Dec. 30, 1980 [JP] Japan .................... 55-186735

[51] Int. Cl.³ .................... G06F 15/46; G05B 19/42
[52] U.S. Cl. .................... 364/513; 318/568; 364/191; 901/3; 901/16; 901/17
[58] Field of Search .......... 364/513, 474, 478, 191, 364/192, 193; 318/568; 414/730; 901/2-5, 16-18, 50

[56] References Cited

U.S. PATENT DOCUMENTS

| | | | |
|---|---|---|---|
| 3,543,910 | 12/1970 | Devol et al. | 901/5 X |
| 3,661,051 | 5/1972 | Dunne et al. | 901/5 X |
| 3,909,600 | 9/1975 | Hohn | 364/513 |
| 3,920,972 | 11/1975 | Corwin, Jr. et al. | 364/300 X |

Primary Examiner—Joseph F. Ruggiero
Attorney, Agent, or Firm—Staas & Halsey

[57] ABSTRACT

A robot control system for teaching and operating a robot 13 on the basis of a rectangular coordinate system, the robot having an arm which operates on the basis of a cylindrical coordinate system. Provided are a teaching device 101 for providing instructions in the rectangular coordinate system in order to teach the operations performed by the robot 13, a rectangular-to-cylindrical conversion device 104 or 202 for converting the instructions in the rectangular coordinate system from the teaching device 101 into command data in the cylindrical coordinate system, and a data memory 108 for storing the acquired command data in the cylindrical coordinate system.

9 Claims, 7 Drawing Figures

Fig. 2
| |
|---|
| Vo |
| Ro |
| Zo |
| Θo |
| S code #1 |
| S code #2 |
| S code #3 |
| S code #4 |
| S code #5 |
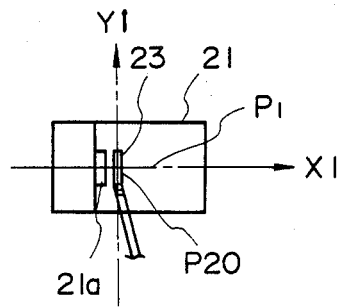
Fig. 3
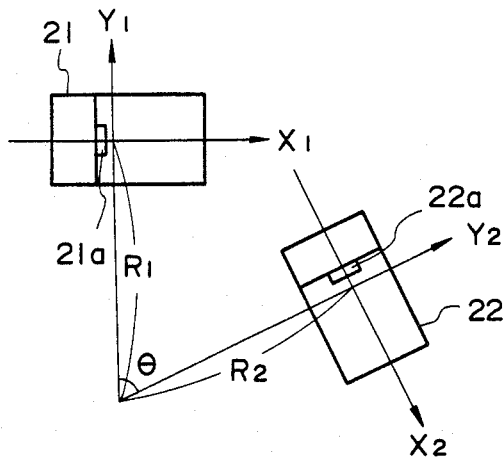
Fig. 4

ROBOT CONTROL SYSTEM

BACKGROUND OF THE INVENTION

This invention relates to a robot control system for operating a robot in accordance with positional information in the form of rectangular coordinates, the robot having a hand which operates on the basis of cylindrical coordinates, more particularly, the invention relates to a robot control system wherein a robot which operates in a cylindrical coordinate system is taught using a rectangular coordinate system.

In recent years, robots have come into widespread use on assembly lines and a variety of such robots have been proposed. These robots come equipped with a hand which, for the sake of simplifying control, is controlled on the basis of a cylindrical coordinate system.

A robot, specifically with the robot hand, responds to requests from a machine tool by performing a variety of services such as loading and unloading a workpiece to and from the machine tool as well as changing tools, on the basis of robot command data which is taught or edited in advance. FIG. 1 is a block diagram of a conventional robot control system of this kind. In FIG. 1, numeral 11 denotes a robot control device comprising a computer and having a processor 11a comprising a microcomputer or the like, a control program memory 11b for controlling teaching, playback, editing and the like, a data memory 11c for storing robot command data created on the basis of data entered from a teaching box 12 to be described later, and a working memory 11d for storing the current position, along each axis, of the robot hand which operates in a cylindrical coordinate system, and for storing data memory addresses, the operating speed of the hand, service codes indicating the kind of service to be performed by the robot, etc. The data memory 11c includes minor regions at addresses 0 to 299, each minor region storing robot command data comprising operating speed V0, coordinates that indicate the position of a commanded point, namely coordinates R0 (position along the direction of arm extension and retraction), Z0 (position along the vertical direction), $\theta 0$ (position along the direction of swiveling), as well as a maximum of five service codes for services executed at the commanded point, as shown in FIG. 2 which is an illustrative view of a storage region in data memory 11c. Numeral 12 denotes the teaching box having various buttons, for teaching robot operations, as well as numerical devices, etc. Numeral 13 denotes a robot which operates on the basis of a cylindrical coordinate system. Numerals 14, 15 and 16 denote machine tools, such as lathes, serviced by the robot.

In general, a teaching operation in a robot control system of the above kind proceeds in the following order:

(1) Select the teach operation—Establish the teach mode by operating job selection buttons (not shown) on the teaching box 12.

(2) Set address—Enter, by means of a ten-key pad on the teaching box 12, the address of the location of the data memory 11c at which the robot command data is to be stored, and set the address in an address register of the working memory 11d.

(3) Teach position and operating speed—After an address has been set, move the robot hand to and position it at a commanded point by depressing the buttons on the teaching box 12 one at a time, namely $+R$ and $-R$ jog buttons for the R-axis, $+Z$ and $-Z$ jog buttons for the Z-axis, or $+\theta$ and $-\theta$ jog buttons for the $\theta$-axis. As each jog button is depressed the robot hand moves along the axis specified by the depressed jog button. At such time, pulses for moving the robot hand are generated within the robot control device. These pulses are counted up or counted down by prescribed current position counters of the working memory 11d in accordance with the direction of movement. That is, the current position of the hand is stored in current position counters, one for each axis, at all times. Next, enter the operating speed by means of the ten-key pad on the teaching box 12 to store it in a speed register of the working memory 11d. When a position teach button on the teaching box 12 is depressed, the position of the commanded point on each axis (the contents of the current position counters), and the speed at which the hand is to be moved to the commanded point, are stored at the set address.

(4) After teaching the position and operating speed, enter the robot actions to be executed at the commanded point, in the form of service codes (S-codes), by means of the ten-key pad on the teaching box 12. When an S-code button on the teaching box 12 is depressed, the S-code is stored in an S-code storage area at the above-mentioned address.

(5) Repeating the steps (1) through (4) ends the teaching operation for prescribed robot actions.

Thus, with the conventional teaching operation the position of the commanded point is taught by operating, one after another, the jog buttons for each axis of the cylindrical coordinate system. Since the teaching operation must be performed for each and every machine tool, the operation is extremely troublesome. In particular, in the case of a lathe or the like, the hand must be moved at right angles to the chuck surface in order to load and unload a workpiece in a reliable fashion. Teaching such movement using the conventional cylindrical coordinate system is very troublesome.

Accordingly, an object of the present invention is to provide a robot control system which enables a robot that operates in a cylindrical coordinate system to be taught using a rectangular coordinate system.

Another object of the present invention is to provide a robot control system which enables what is taught in a rectangular coordinate system at one commanded point to be utilized at another commanded point as well.

SUMMARY OF THE INVENTION

Specifically, with the present invention there are provided a teaching device for instructing and teaching robot actions on the basis of a rectangular coordinate system, as well as rectangular-to-cylindrical coordinate conversion device for converting the instructions in rectangular coordinates from the teaching means into command data in cylindrical coordinates. This permits even a robot that operates in a cylindrical coordinate system to be taught instructions on the basis of a rectangular coordinate system. Accordingly, teaching is simplified and even translational motion of the robot arm can be taught with ease. Further according to the invention, in order to obtain command data with respect to an origin at a position different from the origin of a rectangular coordinate system serving as the basis of acquired command data, a coordinate conversion device is provided for converting corresponding command data into other command data in accordance with the difference between the cylindrical coordinate values of the two origins. This eliminates the necessity of a teaching operation for the other origin and is extremely useful especially in a system such as a machine tool system wherein a robot performs the same services at each of a plurality of different positions, the reason being that the teaching operation need be executed only once.

BRIEF DESCRIPTION OF THE DRAWINGS

FIG. 2 is an illustrative view for describing an example of robot command data stored in a data memory shown in the block diagram of FIG. 1;

FIGS. 3 and 4 are schematic illustrative views of a robot control system according to the present invention.

DESCRIPTION OF THE PREFERRED EMBODIMENTS

Figure 1:
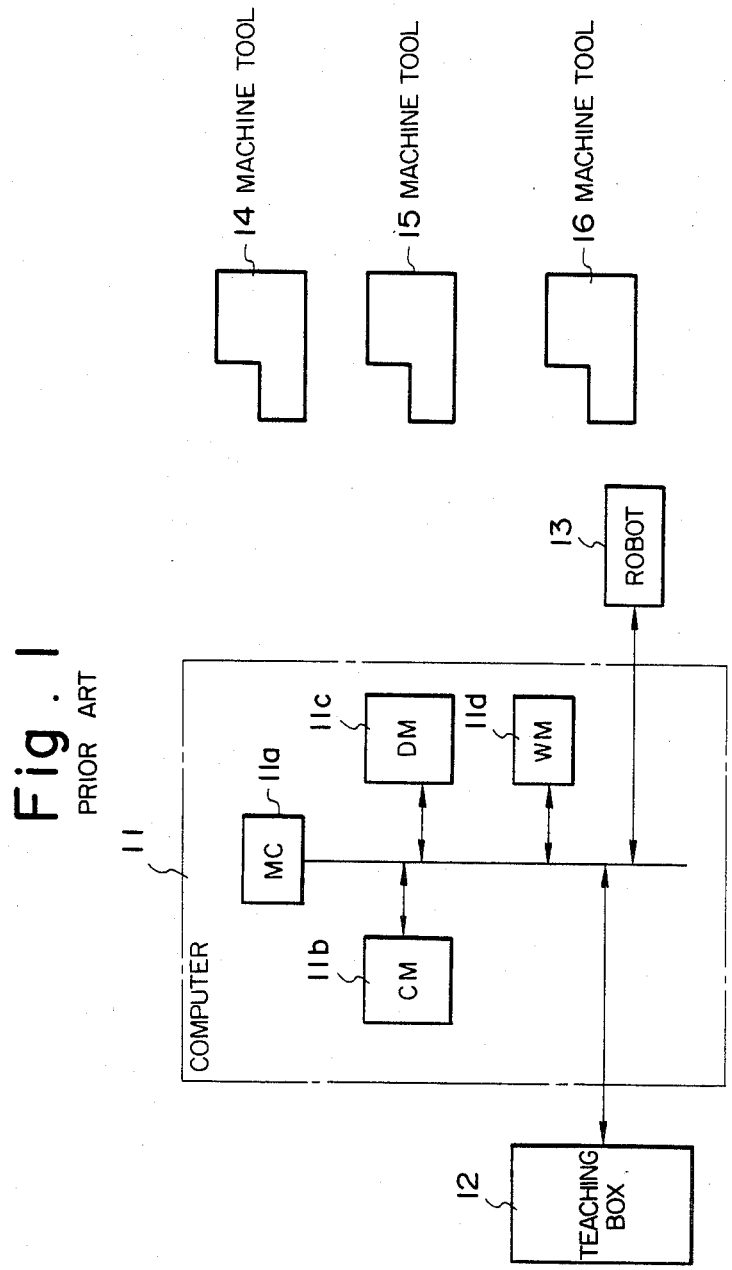
FIG. 1 is a block diagram of a conventional robot control system.

Hereinafter an embodiment of the present invention will be described in detail with reference to the drawings.

FIGS. 3 and 4 are illustrative views for describing the operation of a robot control system according to the present invention. Numerals 21 through 22 denote machine tools such as lathes, 21a and 22a denote chucks on the lathes, and 23 denotes the distal end of a robot hand.

In the drawings, the end 23 of the robot hand is shown gripping a workpiece that is being attached to the chuck 21a of lathe 21.

In the present invention, a rectangular coordinate system (FIG. 3) is established for the machine tool serviced by the accompanying robot, and the robot actions are taught on the basis of this rectangular coordinate system. That is, the hand 23 is made parallel to the surface of chuck 21a, and is then centered on the chuck. The hand direction at this time (the direction parallel to the surface of chuck 21a) is taken as the Y-axis, and the center direction (the direction orthogonal to the surface of chuck 21a) is taken as the X-axis. This establishes a rectangular coordinate system the origin whereof is set as the final target position. In a case where teaching is conducted through a manual operation, the teaching box 12 is provided with four jog buttons for commanding jog feeds in the +X, −X, +Y and −Y directions, respectively (a single changeover switch may be provided so that these jog buttons may also serve as cylindrical coordinate system jog buttons), and with a rectangular cylindrical coordinate conversion device. Accordingly, when the ±X, ±Y jog buttons are depressed, pulses are generated along the R- and θ-axial directions of the cylindrical coordinate system under the control of the rectangular→cylindrical coordinate conversion device in such fashion that the hand 23 moves along the commanded X or Y axis. These pulses therefore are counted up or down, in accordance with the direction of movement, by current position counters for the R and θ axes. When the content of these registers are stored in the data memory at the time that the commanded point is reached (the point at which the hand 23 reaches the chuck 21a, for example), this ends the teaching of position in the cylindrical coordinate system by means of the rectangular coordinate system input.

On the other hand, in a case where robot command data is created by an editing function, a rectangular→cylindrical coordinate conversion device is provided. Further, in a case where the commanded point is a point P1 which is +50 mm along the X axis from the origin P20 of the rectangular coordinate system,

P 20, 50 are entered by means of the teaching box, after which the rectangular coordinates of the point P1 are converted into cylindrical coordinates by the rectangular→cylindrical coordinate conversion device to provide the taught data for the position.

In a case where the robot loads and unloads workpieces on and from a plurality of machine tools such as lathes 21 and 22, as shown in FIG. 4, a rectangular coordinate system is established for each lathe in the same manner as shown in FIG. 3, and the difference between the cylindrical coordinates of the origins of both rectangular coordinate systems, namely the angle θ, is entered in advance (it should be noted that when both origins do not lie on the same circumference, that is, when R1≠R2, the distance ΔR=R1−R2 also is entered in the form of cylindrical coordinates). By so doing, it is possible to convert the robot command data for the origin of lathe 21 in rectangular coordinates into the robot command data for the origin of lathe 22 in rectangular coordinates.

The entry of such rectangular coordinate systems data is useful for either teaching the robot up to a predetermined point in cylindrical coordinates in advance or for setting the predetermined point directly in cylindrical coordinates, and then teaching the robot up to the target point with the predetermined point serving as the origin of the rectangular coordinate system. In other words, rough positioning is carried out in a cylindrical coordinate system, while fine positioning is carried out in a rectangular coordinate system with the roughly positioned point as the origin.

Figure 5:
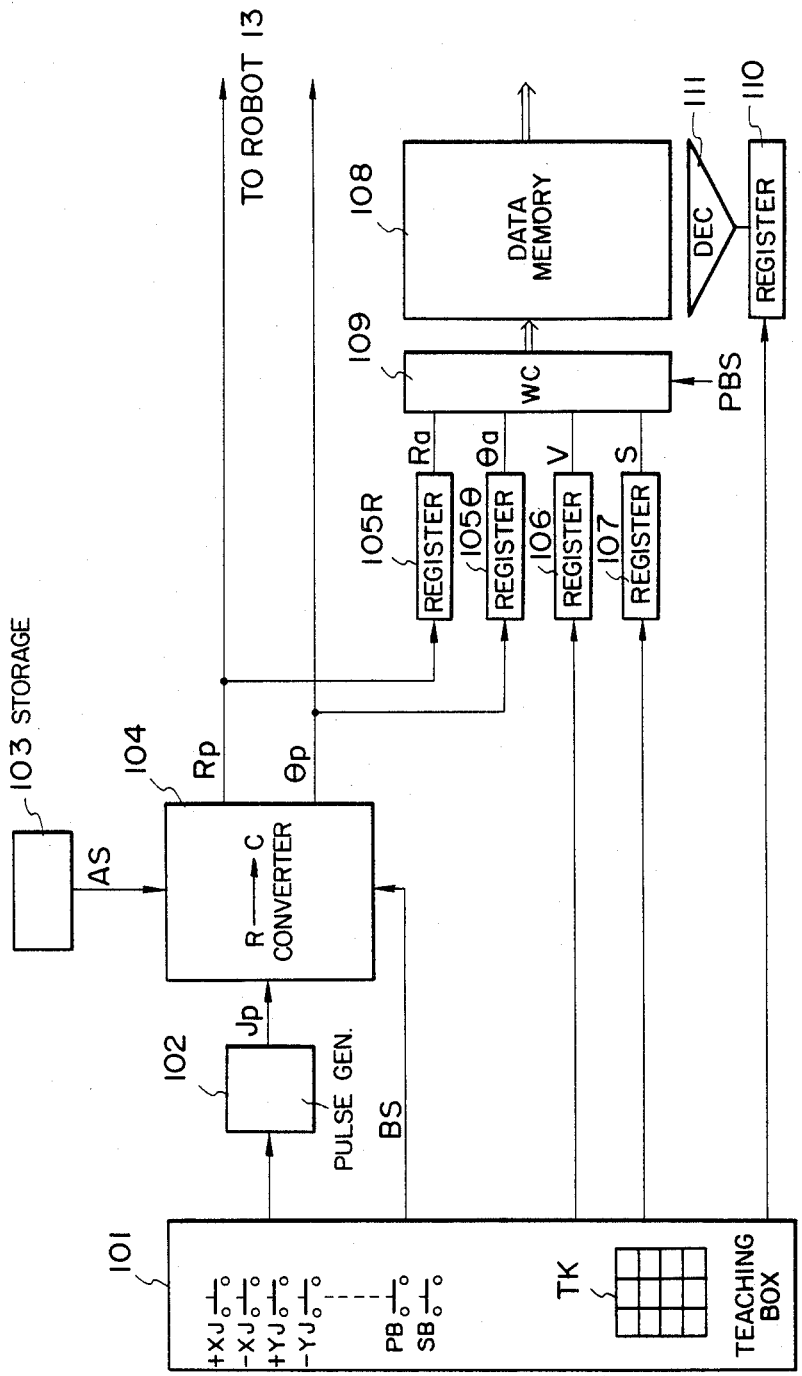
FIGS. 5, 6 and 7 are circuit block diagrams each illustrating an embodiment of a robot control system according to the present invention.

FIG. 5 is a block diagram illustrating an embodiment of a robot control device in a robot control system according to the present invention. In FIG. 5, numeral 101 denotes a teaching box. +XJ, −XJ, +YJ and −YJ denote manually operable jog buttons for commanding the jog feed of a robot hand in the directions of the X and Y axes, respectively, PB denotes a position teaching button, SB an S-code button, and TK a ten-key pad for entering numerical values. Numeral 102 designates a pulse generator for generating jog feed pulses when each of the jog buttons is depressed. Numeral 103 denotes a rectangular coordinate system information storage device for storing information AS on the above-mentioned rectangular coordinate systems (FIGS. 3 and 4) established for each machine tool (which information may be the coordinate values of the origin expressed in cylindrical coordinate systems R, Q, by way of example). Numeral 104 denotes a rectangular→cylindrical coordinate conversion device for converting pulses JP, generated by the pulse generator 102, into R-axis pulses Rp and θ-axis pulses θp so as to move the hand along the X or Y axes, based on the rectangular coordinate system information AS and on button information BS indicative of which jog button is being depressed.

By way of example, when the cylindrical coordinates R and θ of the origin of a rectangular coordinate system are given as the rectangular coordinate system information As, the cylindrical coordinate values ΔR, Δθ necessary for movement along the X and Y axes are given by the following equations:

For movement along the X-axis, $$\Delta\theta = \tan^{-1}(X/R)$$

$$\Delta R = (R/\cos \Delta\theta) - R$$

For movement along the Y-axis, $$\Delta\Theta = Y$$

It then suffices to perform the above computations and produce pulses of a number corresponding to the obtained values of $\Delta\theta$ and $\Delta R$, the pulses produced serving as the $\theta$-axis pulses $\theta$p and R-axis pulses Rp. Accordingly, the rectangular→cylindrical coordinate conversion device 104 comprises an arithmeric circuit and a pulse generating circuit.

Numerals 105R and 105$\theta$ denote current position registers for the R and $\theta$ axes. The registers 105R and 105$\theta$ store the current positions Ra, $\theta$a along the R and $\theta$ axes by counting up or counting down the R-axis pulses Rp and $\theta$-axis pulses $\theta$p, respectively, in accordance with the direction of movement.

Numerals 106 and 107 denote speed and S-code registers, respectively, for storing an operating speed V and S-code entered by the teaching box 101. Numeral 108 denotes a data memory (FIG. 2) for storing robot command data, 109 a write control circuit, 110 an address register in which the address of the data memory 108 is set, and 111 a decoder for decoding the address set in the address register. The data memory 108 is connected to the processor 11a and control program memory 11b through a data bus, just as the data memory 11c of FIG. 1.

When the teach operation is selected on the teaching box 101 and the jog button +XJ for the X-axis direction is held depressed, the pulse generator 102 generates the jog pulses JP. Using the rectangular coordinate system information AS and the button information BS, the rectangular→cylindrical coordinate conversion device 104 converts the jog pulses JP into the R-axis pulses Rp and $\theta$-axis pulses $\theta$p, which are delivered as output signals, so as to move the hand in the +X-axis direction. These R-axis pulses Rp and $\theta$-axis pulses $\theta$p enter respective servo circuits (not shown) of the robot 13 and serve to extend, retract and swivel the hand of the robot 13 and to move the hand in its entirely along the X-axis. The pulses Rp and $\theta$p are also counted up or counted down, in accordance with the direction of movement, by the R-axis current position counter 105R and $\theta$-axis current position counter 105$\theta$. When the jog button +XJ is released as the hand arrives at the target position, the generation of the jog pulses JP ceases and, hence, so does the generation of the R-axis pulses Rp and $\theta$-axis pulses $\theta$p. The hand therefore stops moving.

Thenceforth, when the operating speed V is applied to the speed register 106 by means of the ten-key pad TK on the teaching box 101, and when the position teach button PB is depressed, the teaching box 101 produces a signal PBS and the write control circuit 109 writes Ra, $\theta$a and V into the data memory 108 at the address set by the address register 110. When an S-code is subsequently taught in the same manner as practiced conventionally, the S-code is likewise written into the data memory 108 at the corresponding address, thereby ending the teaching of the robot actions at the commanded point.

A case has been illustrated wherein the teaching box 101 is provided solely with jog buttons of a rectangular coordinate system. In actual practice, however, the teaching box also includes jog buttons of a cylindrical coordinate system, namely for $\pm R$, $\pm \theta$ and $\pm Z$ axes and the like (where the same buttons may be used conjointly for the rectangular and cylindrical coordinate system jog buttons), wherein teaching may be conducted on the basis of the rectangular coordinate system or on the basis of the cylindrical coordinate system, as desired.

The jog pulses produced by working such cylindrical coordinate system jog buttons are the R-axis pulses Rp and $\theta$-axis pulses $\theta$p. These outputs are therefore applied directly to the R-axis current position counter 105R and $\theta$-axis current position counter 105.

Figure 6:
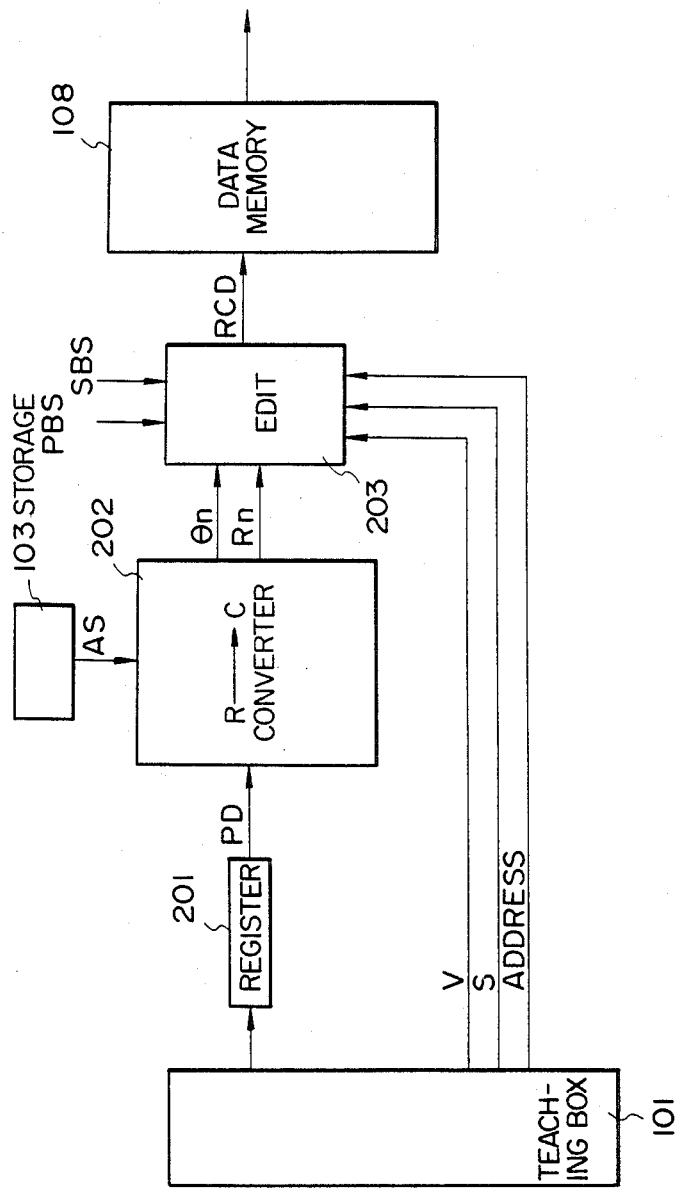

FIG. 6 is a block diagram illustrating another embodiment of a robot control apparatus according to the present invention, exemplifying the creation and teaching of robot command data by means of an editing function.

In FIG. 6, numeral 101 denotes a teaching box having a ten-key pad, 103 a rectangular coordinate system information storage means, and 108 a data memory. Numeral 201 designates a position register for storing position data PD, in a rectangular coordinate system, indicative of a commanded point. The position data PD is entered by means of the ten-key pad on teaching box 101. Numeral 202 represents a rectangular→cylindrical coordinate conversion device for converting the positional data PD in rectangular coordinates into cylindrical coordinate values Rn and $\theta$n, on the basis of rectangular coordinate system information AS. Numeral 203 represents an editing device for editing robot command data. The editing device 203 receives the cylindrical coordinate values $\theta$n and Rn as well as the operating speed V, S-code and addresses, etc., entered via the ten-key pad of the teaching box 101, and functions to combine these inputs to create robot command data RCD and store the robot command data in the data memory 108.

It should be noted that the data memory 108 is connected to the processor 11a and control program memory 11b via a data bus, as described above with reference to FIG. 1.

When the teaching box 101 enters

P20, X50 as the position of a commanded point, this data is applied to the rectangular→cylindrical coordinate conversion device 202 through the position register 201. It should be noted that P20 is a symbol specifying a rectangular coordinate system, and that X50 is a symbol indicating a position which is 50 mm in the +X direction from the origin P20 of the rectangular coordinate system.

Upon receipt of the position data PD, the rectangular cylindrical coordinate conversion device 202 performs a rectangular-to-cylindrical coordinate conversion using the rectangular coordinate information P20 and rectangular coordinate value X50 specified by the position data, and provides the editing device 203 with the cylindrical coordinate values Rn and $\theta$n.

It should be noted that the rectangular→cylindrical coordinate conversion device 202 has the same construction as that of the conversion device 104 shown in FIG. 5.

Next, when the operating speed V is entered by the teaching box 101 and the position teach button of the teaching box 101 is depressed, the position teach button signal PBS goes to logical "1", whereby the editing device 203 writes Rn, θn and V into the previously set address of data memory 108. When an S-code is subsequently taught, such completes the teaching of robot actions at the commanded point. SBS denotes a signal produced by depressing the S-code button.

Figure 7:
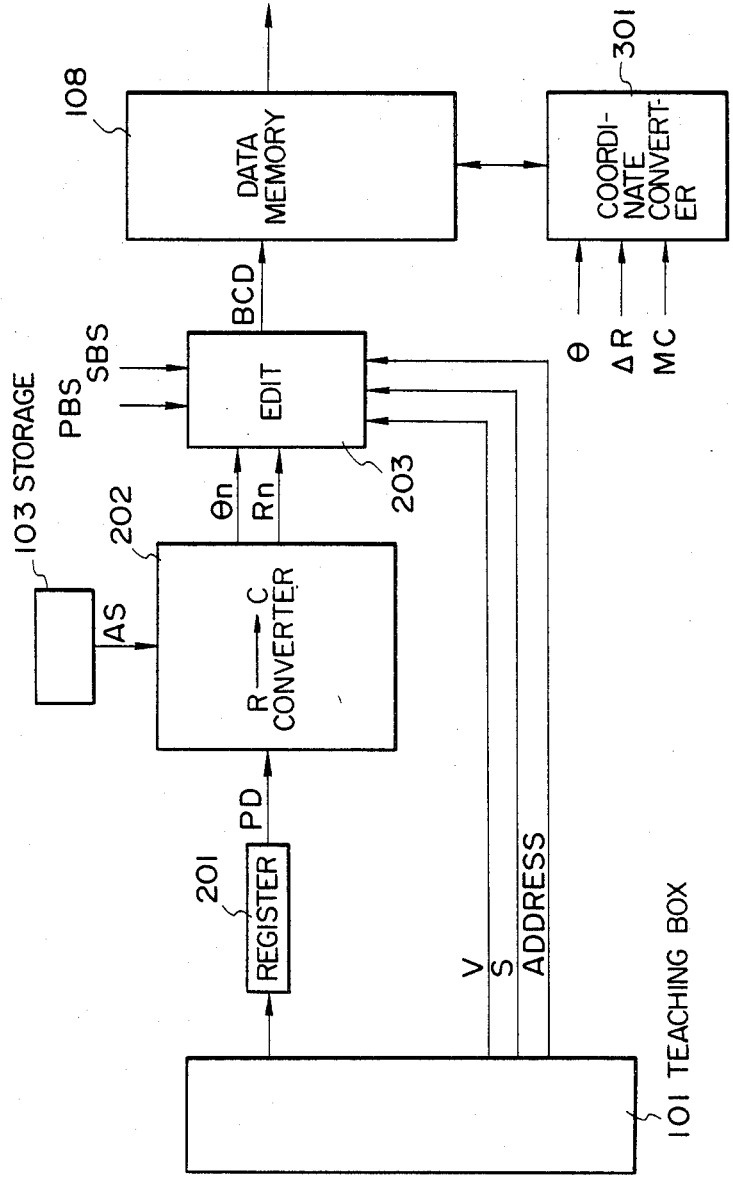

In a case where a robot is to perform the same service for a number of machine tools, the robot command data taught in the rectangular coordinate system of one machine tool can be utilized for the other machine tools as well. FIG. 7 is a block diagram illustrating another embodiment of a robot control apparatus according to the present invention, exemplifying a case wherein one item of robot command data is used in common for a plurality of machine tools. In this embodiment the arrangement of FIG. 6 is provided with a coordinate conversion device 301 connected to the data memory 108.

The angle $\theta$ and the radial difference $\Delta R = R1 - R2$ (FIG. 4), measured from the origin of the rectangular coordinate system of the reference machine tool (22 in FIG. 4, by way of example) to the origin of the rectangular coordinate system established for each machine tool (such as 21 in FIG. 4), are entered and stored in the coordinate conversion device 301 for each machine tool. When a machine tool identifying code MC is entered in creating the robot command data for a predetermined machine tool, the coordinate conversion means 301 reads the robot command data relating to the reference machine tool from the data memory 108, subjects the data to a coordinate conversion and writes the converted data into the data memory 108 at a predetermined, separate address.

Thus, the robot command data relating to the reference machine tool can be converted by the coordinate conversion device 301 into robot command data relating to another machine tool.

In accordance with the present invention as described hereinabove, a hand can be moved along an axis of a rectangular coordinate system by operating a single jog button in a case where teaching is performed manually. This enables a special operation, such as moving the hand at right angles to the chuck, to be performed through a simple manipulation. In a case where robot command data is created by an editing function, the rectangular coordinate values of the commanded point need only be entered to create robot command data and perform teaching in a simple manner. Furthermore, the robot command data relating to a reference machine tool can be subjected to a coordinate conversion to produce robot command data relating to another machine tool, so that it suffices to perform a teaching operating for only a single machine tool, thereby simplifying teaching.

What is claimed is:

1. A robot control system, comprising:
   a robot having a hand which operates on the basis of a cylindrical coordinate system, where said robot operates upon receiving robot command data in a cylindrical coordinate system;
   a robot control device, operatively connected to said robot, having data memory for storing the robot command data for the cylindrical coordinate system, where said robot control device provides said robot with the robot command data;
   teaching means for providing instructions on the basis of a rectangular coordinate system for teaching the actions of said robot;
   rectangular-to-cylindrical coordinate conversion means, operatively connected to said teaching means and said robot control device, for converting the instructions in the rectangular coordinate system from said teaching means into robot command data in the cylindrical coordinate system; and
   coordinate conversion means, operatively connected to the data memory, for converting the robot command data with an origin into different robot command data with a different origin, where in order to use the robot command data at a position with an origin different from the origin of said rectangular coordinate system as the basis of a teaching operation, said coordinate conversion means converts the robot command data in the data memory into the different robot command data depending upon a difference between cylindrical coordinate values of both origins.

2. A robot control system according to claim 1, wherein said teaching means comprises manual input means for generating feed commands along the X and Y axes of the rectangular coordinate system.

3. A robot control system according to claim 2, wherein said manual input means generates feed commands along the positive and negative directions of the X axis and along the positive and negative directions of the Y axis.

4. A robot control system according to claim 1, wherein said teaching means further comprises input means for entering position data in the rectangular coordinate system.

5. A robot control system according to claim 1, further comprising storage means, operatively connected to said rectangular-to-cylindrical coordinate conversion means, for storing cylindrical coordinate values relating to the origin of said rectangular coordinate system, and wherein said rectangular-to-cylindrical coordinate conversion means converts the instruction in said rectangular coordinate system into command data in said cylindrical coordinate system, using the cylindrical coordinate values in said storage means.

6. A robot control system according to claim 1, wherein said data memory stores operating speed as part of said robot command data.

7. A robot control system according to claim 1, wherein said rectangular coordinate system is established for a machine tool provided at a predetermined location.

8. A robot control system according to claim 1, wherein said rectangular coordinate system is established for each of a plurality of machine tools at different positions.

9. A robot control system according to claim 1, wherein said rectangular-to-cylindrical coordinate conversion means comprises:
   an arithmetic circuit operatively connected to said teaching means; and
   a pulse generating circuit operatively connected to said arithmetic circuit and said robot control device.

* * * * *

UNITED STATES PATENT AND TRADEMARK OFFICE
CERTIFICATE OF CORRECTION

PATENT NO. : 4,511,985

DATED : April 16, 1985

INVENTOR(S) : HAJIMU INABA ET AL.

It is certified that error appears in the above-identified patent and that said Letters Patent is hereby corrected as shown below:

Col. 3, line 54 "angular cylindrical" should be --angular → cylindrical--.

Col. 4, line 66, "As," should be --AS,--.

Col. 5, line 15, "arithmerie" should be --arithmetic--.

Signed and Sealed this

Thirteenth Day of August 1985

[SEAL]

Attest:

DONALD J. QUIGG

Attesting Officer — Acting Commissioner of Patents and Trademarks